July 29, 1958 C. W. MARSHALL 2,845,240
PENDULUM EJECTION SYSTEM
Filed Nov. 7, 1956 2 Sheets-Sheet 1

INVENTOR.
CLIFTON W. MARSHALL
BY
ATTORNEYS

July 29, 1958  C. W. MARSHALL  2,845,240
PENDULUM EJECTION SYSTEM
Filed Nov. 7, 1956  2 Sheets—Sheet 2
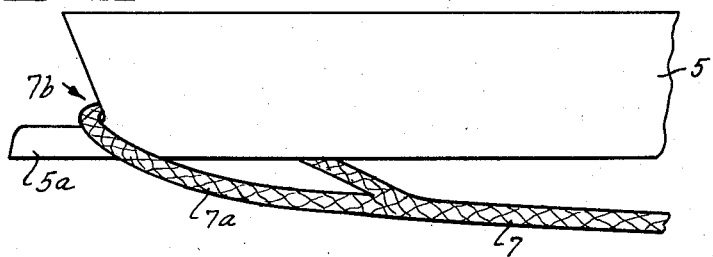
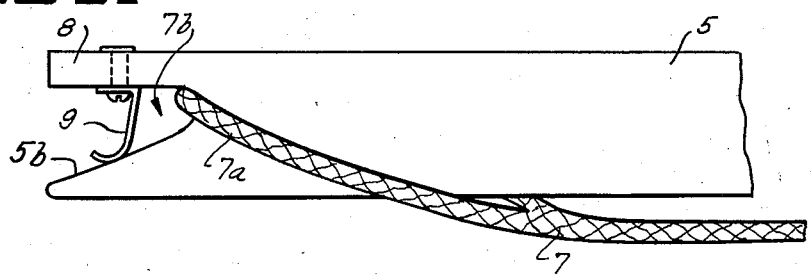
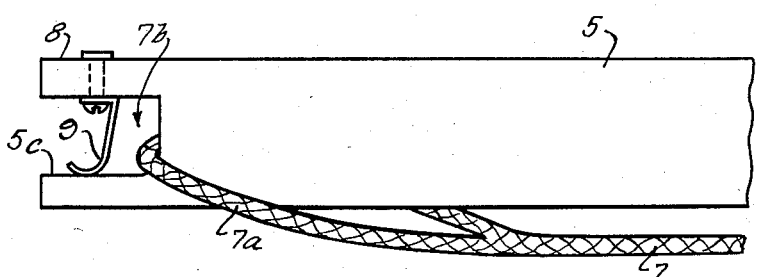
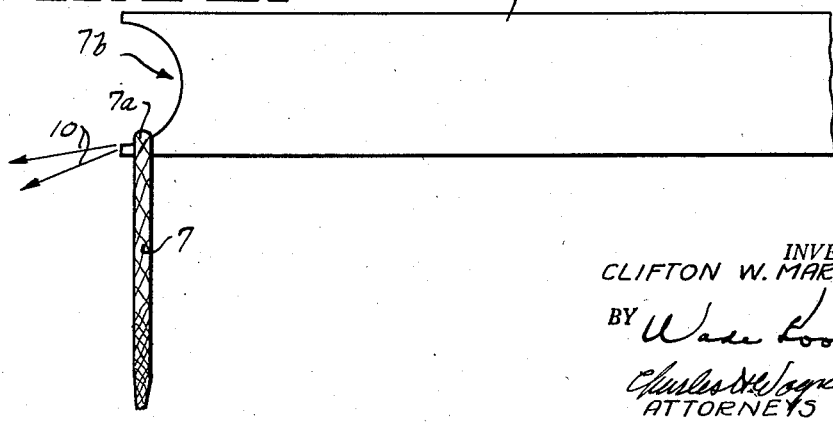
INVENTOR.
CLIFTON W. MARSHALL
BY
ATTORNEYS

United States Patent Office 2,845,240
Patented July 29, 1958

2,845,240

PENDULUM EJECTION SYSTEM

Clifton W. Marshall, El Centro, Calif.

Application November 7, 1956, Serial No. 620,992

8 Claims. (Cl. 244—137)

(Granted under Title 35, U. S. Code (1952), sec. 266)

The invention described herein may be manufactured and used by or for the United States Government for governmental purposes without payment to me of any royalty thereon.

This invention relates generally to a system for the discharge or ejection of an extraction parachute from the cargo type airplane, and more particularly, to a pendulum type ejection system.

With the advent of the very large rear end extraction type cargo aircraft, as for example, the C-119, C-123 and C-130, it has become increasingly necessary to develop a simple and yet rapid and certain system for the extraction of heavy cargo from within the fuselage of such aircraft.

The standard method heretofore used has involved the use of an external weight released by the pilot to withdraw a small pilot chute which in turn removes an extraction parachute from the rear of the aircraft. This method is complicated, time-consuming in rigging, preparation, expensive in component systems needed (pilot chute, pack, etc.), and subject to malfunctions which have endangered the lives of crews and resulted in loss of aircraft. It is, therefore, absolutely essential that such a system involve an ejection which will insure a positive and yet preferably a low cost device or mechanism which will accomplish the objective without damage to the aircraft. The development of an extraction parachute mounted within a deployment pack has been utilized in the present invention. Said deployment pack is, of course, adaptable for connection to heavy cargo stowed in a cargo space of the heavy cargo type aircraft; however, the present invention is concerned solely with the ejection of said parachute without any specific reference to the actual cargo itself. This invention may be utilized as the propellant force for objects other than parachutes and uses other than those involving aircraft.

It is an object of the invention, therefore, to provide an ejection system both unique and yet simple in the ejection of an extraction parachute or any other object.

It is a further object of the invention to utilize an ejection system which may operate solely by the principles of pendulum and gravity.

A still further object of the invention resides in the provision of a new pendulum ejection system which ejects an extraction parachute without the use of any power.

Another object of the invention resides in the provision of a mount for the ejection system which prevents premature release of the extraction parachute and thereby assures development of the maximum ejection force.

An additional object of the invention is in the pendulum attachment wherein a safety holding means is provided to insure the maximum pendulum angle before removal of the pendulum line from said attachment.

Other objects and advantages of the invention will become apparent from the following description, taken in connection with the accompanying drawings, in which like reference characters refer to like parts in the several figures.

Figs. 3a, 3b, 3c and 3d, respectively, illustrate modified forms of the pendulum clip utilized in the invention.

Figure 1:
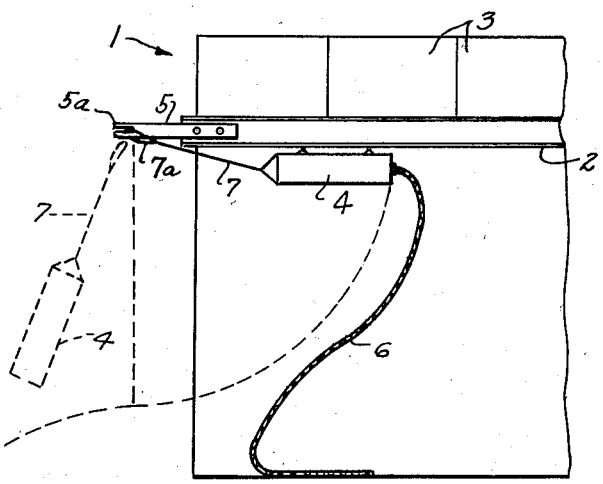
Fig. 1 is a somewhat diagrammatic side view of the pendulum clip of the invention attached to the airplane monorail with the extraction parachute deployment pack suspended at a position lower than the pendulum clip.

With particular reference to Fig. 1 of the drawings, numeral 1 indicates the aft end of the aircraft fuselage, as for example, that of the C-119 type airplane. A monorail 2 is fixedly positioned within said fuselage 1 in the upper portion thereof and immediately above said monorail 2 are located the aircraft ceiling compartments 3. Extending or projecting from the aft end of said monorail 2 is the pendulum attachment clip 5 which may be made of any desirable material and may be any of the four (4) forms illustrated in Figs. 3a, 3b, 3c and 3d or in a variety of other forms in accordance with particular requirements. Said clip 5 may be mounted either to project from the aft end ceiling (as illustrated in the drawings for descriptive purposes only) or remain inside the aircraft depending on the configuration of said aircraft, the vertical unobstructed height of the suspension point from the floor, and the force and distance required for proper ejection. Said clip 5 may, also, be utilized with the C-123 or C-130 types aircraft which have no monorail or with any other aircraft or inclosures or for the movement of heavy items in general without departing from the spirit or scope of the invention by the incorporation of any simple type mount or bracket to achieve the correct placement as regards the vertical and horizontal distances of said clip 5 in relation to the point of suspension. The monorail 2 represents only one method of attaching the pendulum attachment clip 5 and is referred to in the present description for illustrative purposes only. Said simple mount or bracket (not shown) may be used with either the C-119, C-123 or C-130 types or other types aircraft or for other purposes. Attached to the lower edge of said monorail 2 (or other supporting bracket) below and to one side of said attachment clip 5 is the extraction parachute deployment bag 4 in which the extraction parachute is positioned. Said deployment bag 4 is adaptable for suspension by any desired suspension means, the particular nature of which is unimportant to the present invention, and may be, of course, suspended for manual release if desired. Attached to the forward end of said deployment bag 4 is the extraction line web 6, the latter being adaptable for connection to any heavy cargo stowed within said fuselage. The pendulum line or arm 7, which is attached to the aft end of the deployment bag 4, may consist of a nylon parachute suspension line or of any material of a strength sufficient for the suspended weight. On the aft end of said arm 7 is a loop or eye 7a which is held in place in the projecting portion 5a (hereinafter described in detail) of the pendulum attachment clip 5 when the bag 4 is in the raised or suspended condition.

Figure 2:
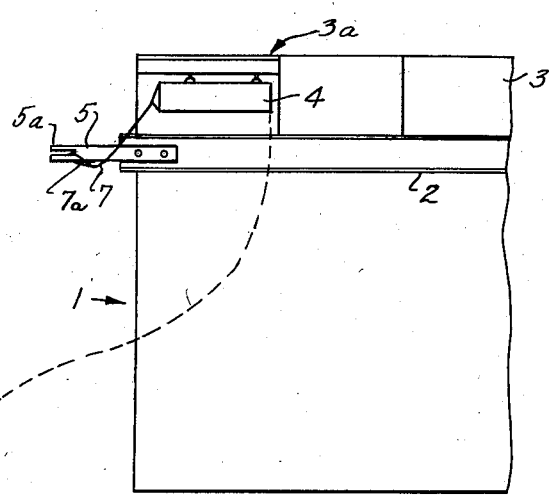
Fig. 2 is a similar view of the pendulum clip of Fig. 1, but illustrating the deployment pack suspended in stowed operative position higher than the pendulum clip.

Referring particularly to Fig. 2 of the drawings, the deployment bag 4 is shown suspended in the extreme aft ceiling compartment 3a of the aircraft. No change has been made in the basic pendulum ejection system as shown in Fig. 2 except that the pendulum line or arm 7 is relatively shorter in length than that of Fig. 1 which, in contrast, utilizes a relatively long pendulum arm 7 in order to accomplish the maximum ejection force. This latter arrangement is necessary since the release of said pendulum line or arm 7 and, hence, the deployment bag 4 from the attachment pendulum clip 5 occurs at a point prior to said pendulum line 6 reaching the vertical position in its trajectory or the pendulum angle reaching 90°. In the event that the suspension of said deployment bag 4 is made in the ceiling compartment 3a (as shown in Fig. 2), the length of the pendulum arm 7 is shortened to not less than 20% of the length of the parachute bag 4 in order to gain the maximum effect of gravity on release of said deployment bag 4.

In Figs. 3a, 3b, 3c and 3d of the drawings, the pendulum clip 5 is illustrated in four (4) somewhat different forms without departing from the spirit or scope of the invention. With particular reference to Fig. 3a, it is seen that the pendulum loop 7a is held in releasable engagement with the projecting portion 5a of said clip 5 by means of friction: However, since the extreme conditions encountered in flight, as for example, down drafts and evasive action create an uncertainty as to how critical is the pendulum force as applied to said point of releasable engagement, means of insuring that premature separation does not occur and the maximum ejection force is always available is illustrated in Fig. 3b. In this latter figure, the positive removal of the pendulum loop 7a from the cutaway portion 7b is assured by the incorporation of the horizontal metal projecting piece 8 to which is attached the safety device or holding clip or spring 9. Said safety device 9 (which is also provided to prevent the pendulum loop 7a from sliding off if allowed to slacken) may be of many types, materials, or designs such as a hinge, rotating cam, break cord or other types of holding means. The latter attachment insures that the pendulum angle reaches a minimum of 90° to vertical prior to the removal of said loop 7a from said clip 5. It has been determined that the angle of release (which controls both the amount of ejection force and the point of release as at 10 in Fig. 3d in the pendulum arc) between the pendulum line or arm 7 and said clip 5 depends on the angle of the inclined surface 5a. In Fig. 3c, however, the inclined surface 5b of Fig. 3b has been eliminated and a straight horizontal surface 5c is utilized for the placement of said safety holding clip or spring 9. This latter arrangement has been determined most effective where the deployment bag 4 is suspended at a point higher than the pendulum attachment, as in the case of Fig. 2 where said bag 4 is mounted in the ceiling compartment 3a. In Fig. 3d, therefore, where the angle of release is obtained from a tangent to the arc of a circle, a fourth form of pendulum clip 5 is illustrated in which the point of release between the pendulum loop 7a and the clip 5 may be varied as desired depending on the particular cargo compartment utilized without departing from the scope of the invention.

To summarize the operation of the pendulum ejection system of the instant invention, the extraction parachute deployment bag 4 of Fig. 1 and Fig. 2 is released from its suspension either to the aircraft monorail 2 (or other supporting bracket) or from within the aircraft ceiling compartment 3a at which point it swings under force of gravity in a pendulum arc by virtue of its connection to the pendulum line 7 which, in turn, is rotating about its engagement with the slotted or cutaway portion 7b of the projecting portion 5a of the pendulum clip 5. Initially friction alone in the case of the pendulum clips 5 of Figs. 3a and 3d and friction plus the resistance of the spring 9 in the case of the pendulum clips of Figs. 3b and 3c, resist any tendency of the pendulum loop 7a to separate from its engagement in said slotted or cutaway portion 7b until the vertical component of the force of gravity is sufficient to overcome the force or forces opposing separation. The specific point in the pendulum arc where separation occurs depends, then, on the angle of release, the height at which the parachute deployment bag 4 is suspended in relation to the position of the pendulum clip 5, the length of the pendulum line or arm 7, and the shape of the projecting portion 5a of said pendulum clip 5 as previously described with reference to Figs. 3a, 3b, 3c and 3d. This point of complete removal may, therefore, take place at the vertical position or at a point just before or after the vertical. Of course, a certain vertical distance must be provided in relation to the horizontal distance required for proper extraction.

Thus, a unique and yet simple pendulum ejection system has been developed which can be used as the propellant force for the extraction of parachutes or other objects which force is effected either entirely by gravity or with an additional force for the ejection of cargo parachutes or other objects, places no restriction on the size or weight of the extraction parachute, or other objects, leaves no obstruction for load clearance after extraction, provides an actuating pendulum which remains with the parachute deployment bag or other object after ejection, and utilizes a pendulum actuating clip and pendulum that may be made of any available low cost material.

I claim:

1. Means for ejecting an extraction parachute from the open rear end of the cargo space of a cargo type airplane, said means comprising an elongated monorail support mounted in said cargo type airplane adjacent the open rear end thereof an extraction parachute deployment bag in depending releasable suspension from said monorail support, a bracket attached to the aft end of said monorail, and an interconnecting member between said deployment bag and said bracket, said bracket member constituting a pendulum attachment clip slotted at one end thereof, said interconnecting member consisting of a pendulum line fastened at one end thereof to said deployment bag and having a loop at the other end thereof in releasable engagement with the slotted end of said pendulum attachment clip, said deployment bag adapted to be released from its releasable suspension from said monorail support to swing in a pendulum arc under action of gravity about the suspension between the loop of said pendulum line and the slotted end of said pendulum attachment clip, said loop becoming disengaged from said slotted end on said deployment bag reaching the vertical, 90°, point in said arc to thereby extract said deployment bag from said airplane cargo space.

2. Means for ejecting an extraction parachute from within the fuselage of a cargo type aircraft as in claim 1, wherein said pendulum attachment clip consists of a rectangular metal plate having a cutaway portion in the aft end thereof, said cutaway portion having a rearwardly inclined surface in engagement with the loop of said pendulum line to provide a suspension point for said deployment bag when the latter is released, said deployment bag swinging in an arc about said suspension point, said inclined surface facilitating separation of said loop from said cutaway portion to complete ejection of said deployment bag from within the fuselage of said aircraft.

3. A pendulum ejection system for ejecting a cargo extraction parachute from within a cargo compartment of an aircraft comprising an aircraft fuselage, a cargo compartment having an aft end and cargo opening within said fuselage, a horizontal support longitudinally positioned in the upper portion of said fuselage within said cargo compartment, an extraction parachute deployment bag releasably suspended in the cargo compartment of said fuselage adjacent said support forwardly of the aft end thereof, a pendulum attachment clip mounted on the aft end of said support in alignment therewith and having a horizontally slotted aft extremity projecting rearwardly therefrom adjacent the aft end opening of said cargo compartment, and a pendulum line affixed at its forward end to the aft end of said deployment bag and releasably held at its aft end in said slotted aft extremity of said pendulum attachment clip until said deployment bag has swung to a substantially vertical releasing position on release of said deployment bag from its releasable suspension in said cargo compartment.

4. In a pendulum ejection system, a cargo-type airplane fuselage, a cargo compartment incorporated in said fuselage having an open aft end for the extraction of cargo therethrough, an extraction parachute deployment bag releasably positioned in said cargo compartment adjacent said aft end when in mounted condition, a pendulum attachment bracket affixed in and projecting from the open aft end of said cargo compartment rearwardly of said deployment bag and having a slanted slotted rear end, and a pendulum line between said deployment bag and said bracket permanently affixed at one end to said bag and incorporating a loop at the other end thereof in releasable engagement with the slanted slotted rear end of said bracket, said deployment bag adapted to be released from its mounted condition in said cargo compartment to swing downwardly and rearwardly under gravity with said pendulum line in an arc about said loop engagement with said bracket toward the open aft end of said cargo compartment releasing said loop from engagement with the slanted slotted rear end of said bracket at a predetermined point in said arc to extract said deployment bag rearwardly through the open aft end of said cargo compartment.

5. In a pendulum ejection system mounted in the rear end extraction type cargo airplane, a cargo compartment having an open aft end and a ceiling compartment adjacent said open aft end, an extraction parachute deployment bag releasably mounted in said aft end ceiling compartment of said cargo compartment, a pendulum attachment bracket member mounted in said cargo compartment adjacent said open aft end of said cargo compartment rearwardly of said aft end ceiling compartment and having a substantially horizontally slotted aft end portion adjacent said open aft end, a pendulum line affixed at its forward end to the aft end of said deployment bag and incorporating a loop portion at its aft end releasably engaged in said horizontally slotted aft end portion of said pendulum attachment bracket member when said deployment bag is positioned in said aft end ceiling compartment and releasable therefrom at a perdetermined point when said deployment bag is released from said ceiling compartment to swing downwardly and rearwardly towards the open aft end of said cargo compartment on said pendulum line in an arc about the loop engagement between said pendulum line and the horizontally slotted aft end portion of said pendulum attachment bracket member.

6. In a pendulum ejection system as in claim 5, said horizontally slotted aft end portion including a lower rearwardly inclined surface in slidable engagement with said loop portion to facilitate removal thereof from said bracket member after said deployment bag has reached said predetermined point in said pendulum arc.

7. In a pendulum ejection system as in claim 5, said slotted aft end portion including an upper horizontal projecting element, and a safety holding attachment mounted on said upper horizontal projecting element extending across the open end of said slotted aft end portion to restrain said loop portion from disengagement therefrom until said deployment bag has swung to substantially vertical position where the force of gravity acting on said loop portion effects a vertical component in excess of the restraining force of said safety holding attachment to disengage said loop portion from said slotted aft end portion.

8. In a cargo-type aircraft, an open rear end cargo compartment, and means for extracting a load from the open rear end of said cargo compartment, said means comprising, a main load support member affixed in said cargo compartment and adaptable for releasably supporting said load at substantially the same level as said load support member, an auxiliary load support member affixed to said main load support member adjacent said open rear end rearwardly of said load for supporting said load when said load is being extracted from said cargo compartment, said auxiliary load support member having a downwardly and rearwardly inclined cutaway portion facing towards said open rear end, and a load line affixed at one end to said load and having a loop portion at its other end in releasable engagement with said cutaway portion of said auxiliary load support member and supporting and extracting said load in a pendulum arc out the open rear end of said cargo compartment under action of gravity on release of said load from said main load support member.

References Cited in the file of this patent

UNITED STATES PATENTS

| 1,944,801 | Nichols | Jan. 23, 1934 |
| 2,345,615 | Manson et al. | Apr. 4, 1944 |
| 2,386,839 | Bronson | Oct. 16, 1945 |

FOREIGN PATENTS

| 692,820 | France | Apr. 23, 1934 |